(12) United States Patent
Sunagar et al.

(10) Patent No.: US 9,800,664 B2
(45) Date of Patent: Oct. 24, 2017

(54) WIRELESS CONNECTION MANAGEMENT

(71) Applicant: Harman International Industries, Incorporated, Stamford, CT (US)

(72) Inventors: Praveen Sunagar, Bangalore (IN); Mohan Krishna Ranganathan, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 85 days.

(21) Appl. No.: 14/748,060

(22) Filed: Jun. 23, 2015

(65) Prior Publication Data

US 2016/0381717 A1 Dec. 29, 2016

(51) Int. Cl.
*H04L 29/08* (2006.01)
*H04W 4/00* (2009.01)
(Continued)

(52) U.S. Cl.
CPC .......... *H04L 67/12* (2013.01); *H04B 17/318* (2015.01); *H04W 4/008* (2013.01);
(Continued)

(58) Field of Classification Search
None
See application file for complete search history.

(56) References Cited

U.S. PATENT DOCUMENTS

2011/0110397 A1* 5/2011 Mochizuki ............ H04W 28/20
375/130
2012/0203396 A1* 8/2012 Ochi ................... H04M 1/6091
701/1
(Continued)

FOREIGN PATENT DOCUMENTS

WO 2013163674 A1 11/2013

OTHER PUBLICATIONS

"Why WiFi direct disconnects my WiFi traditional?" Sony Xperia Tablet Community Message Board Website, Available Online at http://community.sony.com/t5/Xperia-Tablet/Why-WiFi-direct-disconnects-my-WiFi-traditional/td-p/300482, Mar. 26, 2014, Retrieved Aug. 25, 2016, 6 pages.

(Continued)

*Primary Examiner* — Jamal Javaid
*Assistant Examiner* — Saad Khawar
(74) *Attorney, Agent, or Firm* — McCoy Russell LLP

(57) ABSTRACT

Embodiments are disclosed for managing wireless communication requests in a communication system. An example in-vehicle computing system comprises a wireless communication interface including a soft wireless access point/group owner coupled to a physical network interface to provide access to a network, a processor, and a storage device storing instructions executable by the processor to receive a first request from a first device to initiate communication via a first wireless client of the first device, during communication via the first wireless client, receive a second request to initiate communication via a second wireless client, and identify a unique identifier of the second wireless client. The instructions are further executable to disconnect a connection to one or more devices via one or more associated wireless clients including the first wireless client, initiate communication via the second wireless client, and selectively re-establish communication via the one or more associated wireless clients.

19 Claims, 7 Drawing Sheets

(51) Int. Cl.
  *H04W 76/06*  (2009.01)
  *H04B 17/318*  (2015.01)
  *H04W 76/02*  (2009.01)
  *H04W 84/00*  (2009.01)
  *H04W 76/04*  (2009.01)

(52) U.S. Cl.
  CPC ........ *H04W 76/064* (2013.01); *H04W 76/028* (2013.01); *H04W 76/043* (2013.01); *H04W 84/005* (2013.01)

(56) References Cited

U.S. PATENT DOCUMENTS

2013/0331031 A1* 12/2013 Palin ................. H04W 52/0245
                                                 455/41.2
2014/0092425 A1*  4/2014 Park ...................... G06F 3/1292
                                                 358/1.15
2015/0038081 A1   2/2015 Bandyopadhyay et al.
2015/0268903 A1*  9/2015 Baba ..................... G06F 3/1236
                                                 358/1.15
2016/0323921 A1* 11/2016 Thanayankizil .... H04W 76/023

OTHER PUBLICATIONS

ISA European Patent Office, International Search Report and Written Opinion Issued in Application No. PCT/US2016/036239, dated Sep. 6, 2016, WIPO, 12 pages.

* cited by examiner

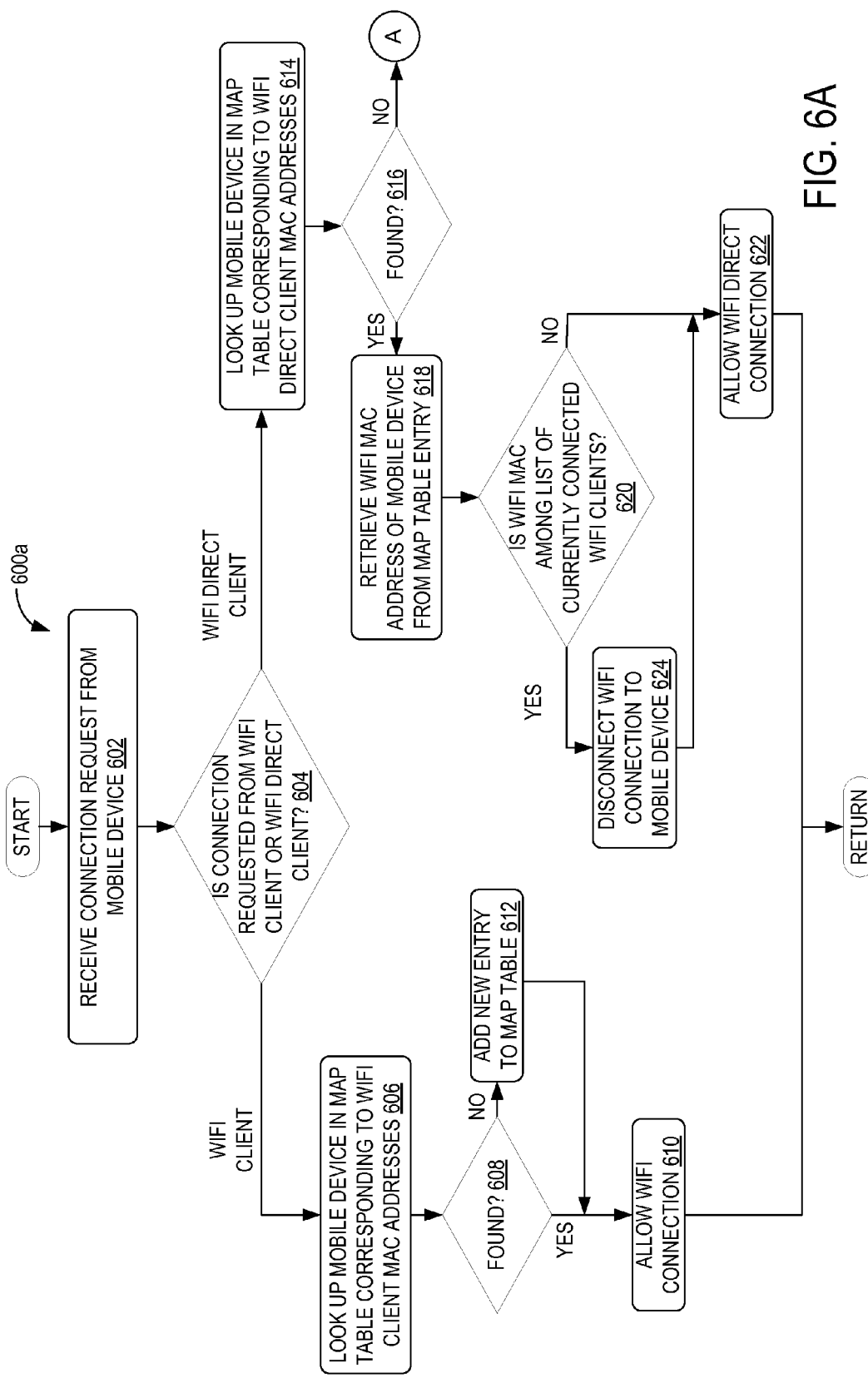

WIRELESS CONNECTION MANAGEMENT

FIELD

The disclosure relates to managing wireless connections to a computing device using different wireless protocols.

BACKGROUND

Mobile computing devices may maintain network connectivity via multiple wireless interfaces, such as WIFI, WIFI direct, BLUETOOTH, NFC, and other wireless interfaces. However, in some embodiments, simultaneous connectivity via two or more of the interfaces may be prohibited or discouraged due to capabilities of the interface hardware. For example, a mobile device may only be able to connect to an access point/group owner via WIFI or WIFI direct, but not both simultaneously.

SUMMARY

Embodiments are disclosed for managing wireless connections between an access point/group owner and one or more mobile devices. In one example embodiment, an in-vehicle computing system comprises a wireless communication interface including a soft wireless access point/group owner coupled to a physical network interface to provide access to a network, a processor, and a storage device storing instructions executable by the processor to receive a first request from a first device to initiate communication via a first wireless client of the first device, during communication via the first wireless client, receive a second request to initiate communication via a second wireless client, and identify a unique identifier of the second wireless client. The instructions are further executable to, responsive to determining that the unique identifier of the second wireless client is not associated with a device in a map that is accessible by the in-vehicle computing system, disconnect a connection to one or more devices via one or more associated wireless clients including the first wireless client, initiate communication via the second wireless client, and selectively re-establish communication via the one or more associated wireless clients.

In further example embodiments, an example a method of managing wireless connections in an in-vehicle computing system comprises receiving a first request from a first device to initiate communication via a first wireless client of the first device, during communication via the first wireless client, receiving a second request to initiate communication via a second wireless client, identifying a unique identifier of the second wireless client, and responsive to determining that the unique identifier of the second wireless client is not associated with a device in a map that is accessible by the in-vehicle computing system, disconnecting a connection to one or more devices via one or more associated wireless clients. The example method further comprises initiating communication via the second wireless client, selectively re-establishing communication via the one or more associated wireless clients, determining that communication with the first device via the first wireless client is not re-established after the selective re-establishing, and associating an identifier of the first device with the second wireless client in the map.

In still further example embodiments, a communication system comprises an in-vehicle computing system including a wireless interface for providing connectivity to a network, a first mobile device connected to the network and the in-vehicle computing system via a first wireless client having a first unique identifier, and a second mobile device connected to the network and the in-vehicle computing system via a second wireless client having a second unique identifier. In the example communication system, the in-vehicle computing system comprises instructions executable by a processor to receive a request to initiate a connection to the network via a third wireless client having a third unique identifier, compare the third unique identifier to a map including unique identifiers mapped to device identifiers, and responsive to determining that the third unique identifier is not included in the map, disconnecting the first wireless client and the second wireless client from the wireless interface, establishing a connection with the third wireless client, and selectively re-establishing connection to the first wireless client and the second wireless client.

BRIEF DESCRIPTION OF THE DRAWINGS

The disclosure may be better understood from reading the following description of non-limiting embodiments, with reference to the attached drawings, wherein below:

FIGS. 6A and 6B illustrate flow charts of a method 600a/600b for accessing and updating a MAC address table for wireless connection management in accordance with one or more embodiments of the present disclosure

DETAILED DESCRIPTION

In order to overcome the issues resulting from attempts to connect via multiple wireless interfaces, such as the lack of support for simultaneous connectivity, the present disclosure provides example systems and methods for switching network connectivity for a single device from a first to a second wireless protocol (e.g., from a first to a second wireless client on the device). For example, if a device is connected to an access point/group owner (e.g., a soft access point/group owner such as a head unit in a vehicle) via WIFI and attempts to connect via WIFI direct simultaneously, typical systems may simply refuse the WIFI direct connection. In such examples, a user may not be informed of the reason for the connection refusal or may circumvent the refusal by manually disconnecting the WIFI connection and re-attempting the WIFI direct connection.

The present disclosure provides example methods and systems for allowing an access point/group owner to automatically handle the switch of a selected device from a first wireless connection (e.g., a WIFI connection) to a second wireless connection (e.g., a WIFI direct connection). The access point/group owner may ensure that a request to connect from a selected device is able to be serviced while maintaining connectivity to any other devices by temporarily disabling connectivity via the first wireless protocol (e.g., WIFI), allowing the selected device to connect via the second wireless protocol (e.g., WIFI direct), then automatically re-instating the connectivity of the other devices via the first wireless protocol.

As used herein, an access point/group owner may include a master device that accepts connections from clients. The access point/group owner provides Internet Protocol (IP) connectivity to the connected clients and may also provide internet access (e.g., if an internet gateway is available). In some examples, an access point may differ from a group owner in that an access point may not be configured (e.g., capable of or programmed to) enter a sleep mode (e.g., whether or not clients are connected, performing data transfer, etc.). A group owner may be able to enter a sleep mode by informing connected clients via a "Notice of Absence" or similar message/broadcast. In some examples, a group owner may accept connections from both WIFI clients and WIFI direct clients, whereas an access point may only accept connections from WIFI clients. Accordingly, the present disclosure may be equally applicable to and/or include access points and/or group owners, as indicated herein.

Figure 1:
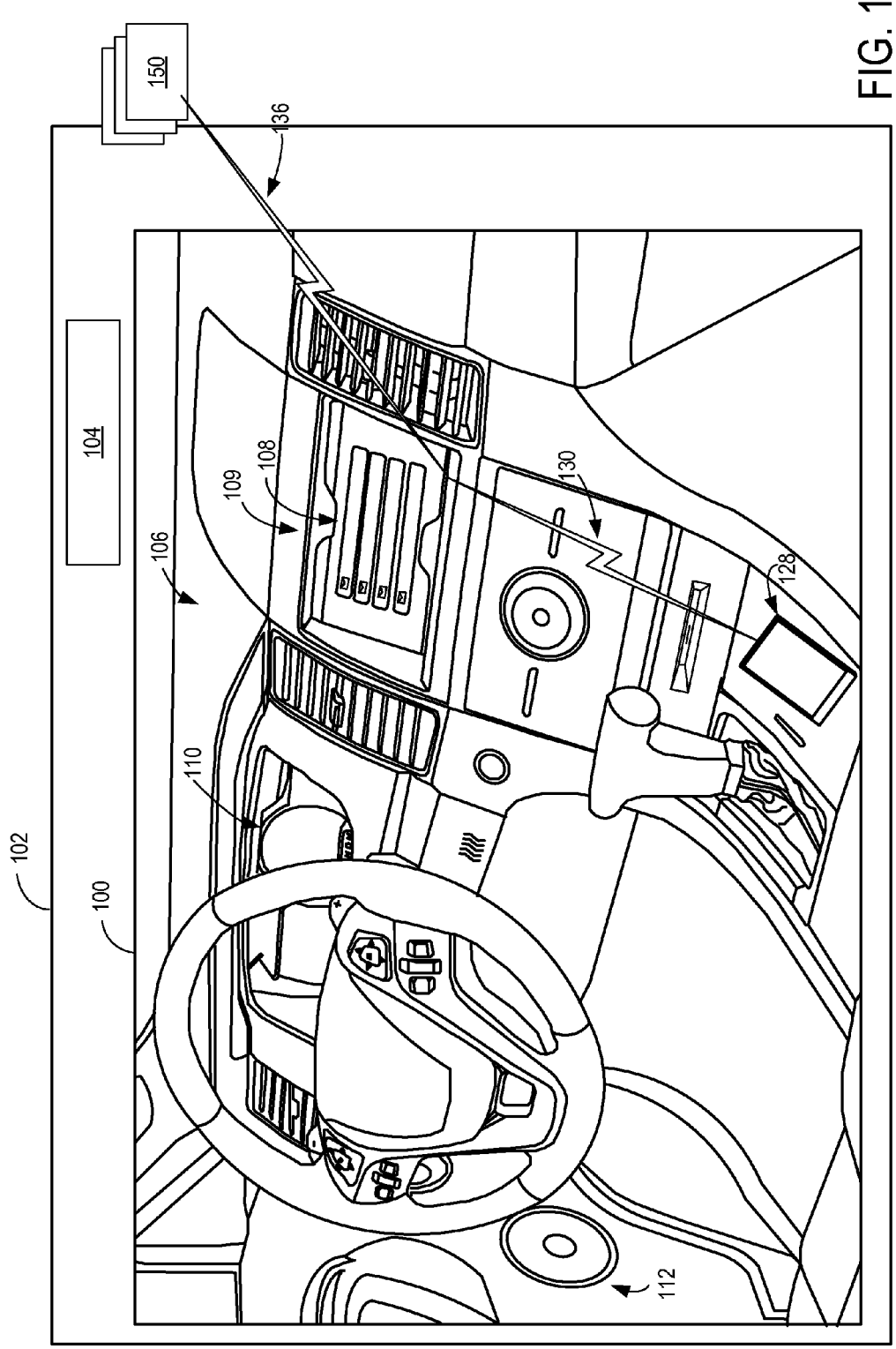
FIG. 1 shows an example partial view of a vehicle cabin in accordance with one or more embodiments of the present disclosure.

As described above, an example environment in which a communication system may be included is a vehicle or a car. It is to be understood, however, that such an example communication system is provided for illustrative purposes and any suitable communication system(s), access point(s)/group owner(s), and client(s) may be included for and/or involved in the wireless connection management described in the present disclosure. For example, an in-vehicle computing system (e.g., a head unit of the vehicle) may provide a soft access point/group owner for mobile devices housed (e.g., temporarily) in the vehicle, such as a driver's mobile phone and one or more passengers' mobile phones. FIG. 1 shows an example partial view of this type of environment for a communication system for wireless connectivity management, including an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct, Wi-Fi Access Point, Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
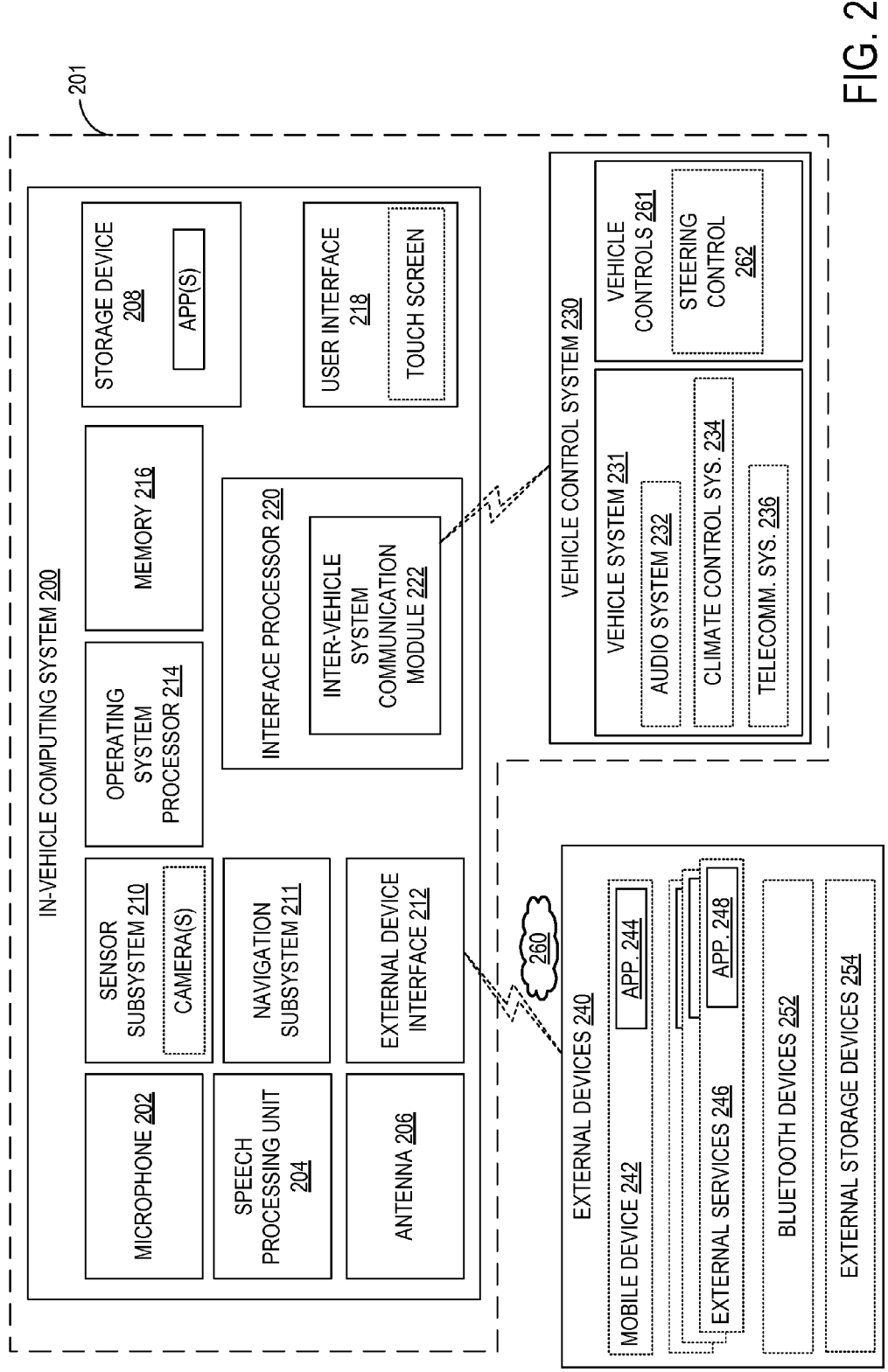
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of an occupant of the vehicle (e.g., the driver/passenger). For example, the external device interface 212 may enable phone calls to be established and/or text messages (e.g., SMS, MMS, etc.) to be sent (e.g., via a cellular communications network) to a mobile device associated with a contact of the driver/passenger. The external device interface 212 may additionally or alternatively provide a wireless communication interface to enable the in-vehicle computing system to synchronize data with one or more devices in the vehicle (e.g., the driver's/passenger's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
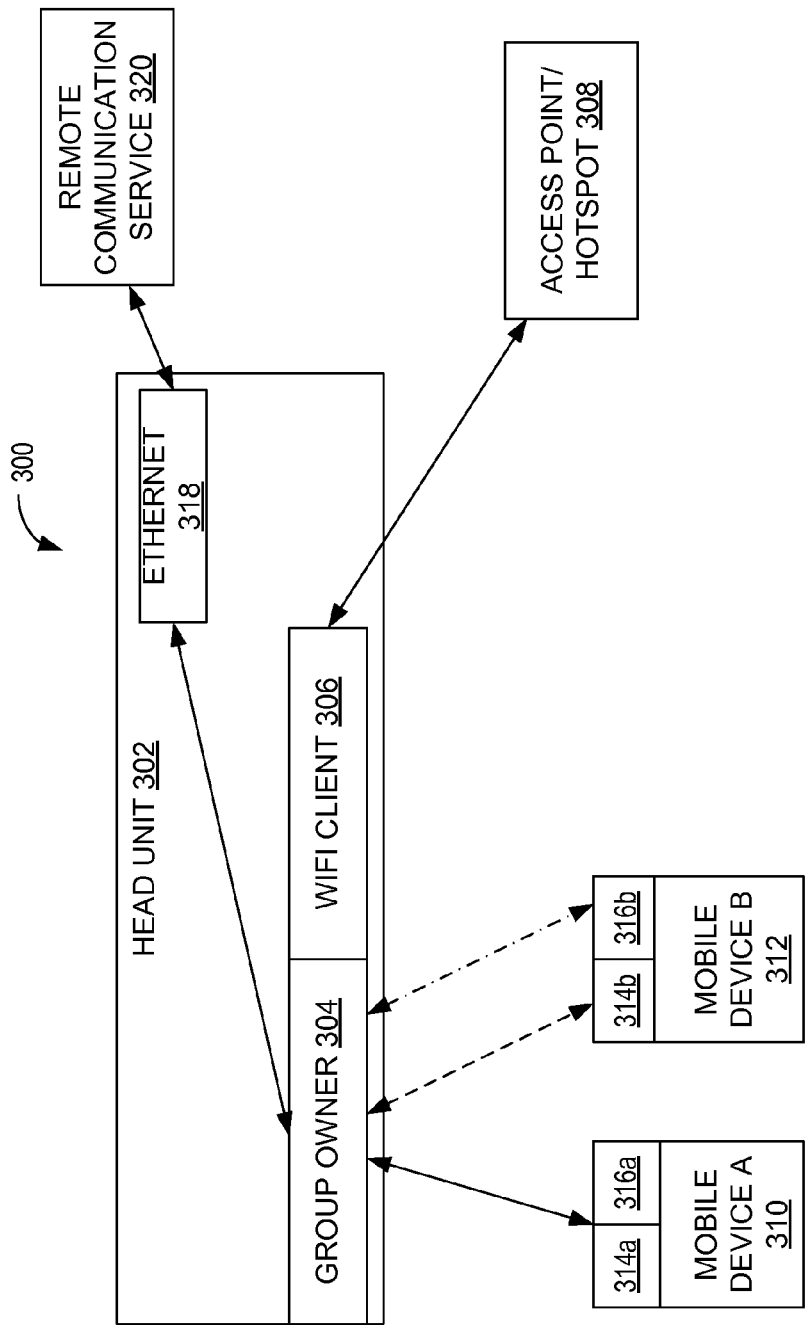
FIG. 3 shows an example communication system in accordance with one or more embodiments of the present disclosure.

FIG. 3 is a block diagram of an example communication system 300 for managing wireless connectivity in mobile devices. For example, communication system 300 may include and/or be included in one or more elements of the vehicle 102 of FIG. 1. Communication system 300 includes a head unit 302, which may be a head unit of a vehicle—providing an interface to one or more vehicle components (e.g., an audio system of the vehicle, climate controls of the vehicle, etc.). For example, head unit 302 may include and/or be included in in-vehicle computing system 109 of FIG. 1. It is to be understood that head unit 302, as illustrated in FIG. 3 is illustrated in a simplified manner to include only a subset of the elements used to provide wireless connectivity to one or more networks. For example, head unit 302 may additionally or alternatively include any one or more of the elements in in-vehicle computing system 200 described above with respect to FIG. 2.

Head unit 302 may include a group owner module 304 for providing a soft access point to a wireless network and a WIFI client module 306 for connecting to another access point or hotspot 308 (e.g., outside of or inside of the vehicle). The access point or hotspot 308 may include a wireless router (e.g., of a business or home near the vehicle) in some examples. In other examples, the access point or hotspot 308 may be included in one or more of mobile devices A or B (310/312). For example, mobile device A and/or B may provide a hotspot for a 3G/4G or other suitable cellular network to which the head unit 302 may connect via WIFI client module 306.

Mobile devices A and B may each include a WIFI client 314a/b and a WIFI direct client 316a/b, which may each be assigned a different, unique Media Access Control (MAC)

address. Each of the WIFI clients and WIFI direct clients (also referred to herein as wireless interfaces) may connect to a network (e.g., connect to the Internet) via group owner 304 of the head unit 302. Group owner 304 may receive data from connected mobile devices according to the protocol associated with the client that is connected (e.g., WIFI data from the WIFI client 314a/b and WIFI direct data from the WIFI direct client 316 a/b) and pass the data to Ethernet module 318. Group owner 304 may additionally or alternatively receive data from the Ethernet module 318 and pass the received Ethernet data to one or more of the WIFI clients 314a/b and WIFI direct clients 316 a/b. Ethernet module 318 may be connected to a remote communication service 320 (e.g., via an antenna, such as antenna 206 of FIG. 2, or a hardwire connection, such as an Ethernet cable), which may provide access to a specialty network service (e.g., ONSTAR) in some examples. In other examples, remote communication service 320 may correspond to an Internet service provider or other network service provider. Remote communication service 320 may be remote from the head unit 302 and/or remote from a vehicle in which the head unit 302 is located. In some examples, data exchanged between head unit 302 and mobile devices A/B (e.g., WIFI data from the WIFI client 314a/b and WIFI direct data from the WIFI direct client 316 a/b) may not be passed to Ethernet module 318 and/or may be consumed/generated/processed within the head unit 302. For example, data from a mobile device may be received over WIFI direct for controlling the head unit 302 and/or a vehicle system (e.g., a display in the vehicle, an operation of the vehicle, speakers within the vehicle, etc.) communicatively coupled to the head unit 302.

As illustrated by the dashed arrows, simultaneous connectivity between the group owner 304 and each of mobile devices A and B is possible, however only one of the WIFI client 314a/b and the WIFI direct client 316a/b of a given mobile device may be connected to the group owner 304 at a time. For example, if the mobile device B is connected to the group owner 304 via WIFI client 314b, a connection to the group owner 304 via WIFI direct client 316b may not be permitted unless the connection via WIFI client 314b is disabled. It is to be understood that while WIFI and WIFI direct clients are illustrated in FIG. 3, the systems and methods described herein may be applied to managing attempted simultaneous connectivity via any conflicting wireless or wired protocols. It is to be further understood that the systems and methods described herein may additionally be applied to communication systems in which more or fewer than two devices are connected to a head unit. Example methods of managing such a connectivity swap are described below with respect to FIGS. 4 and 5.

Figure 4:
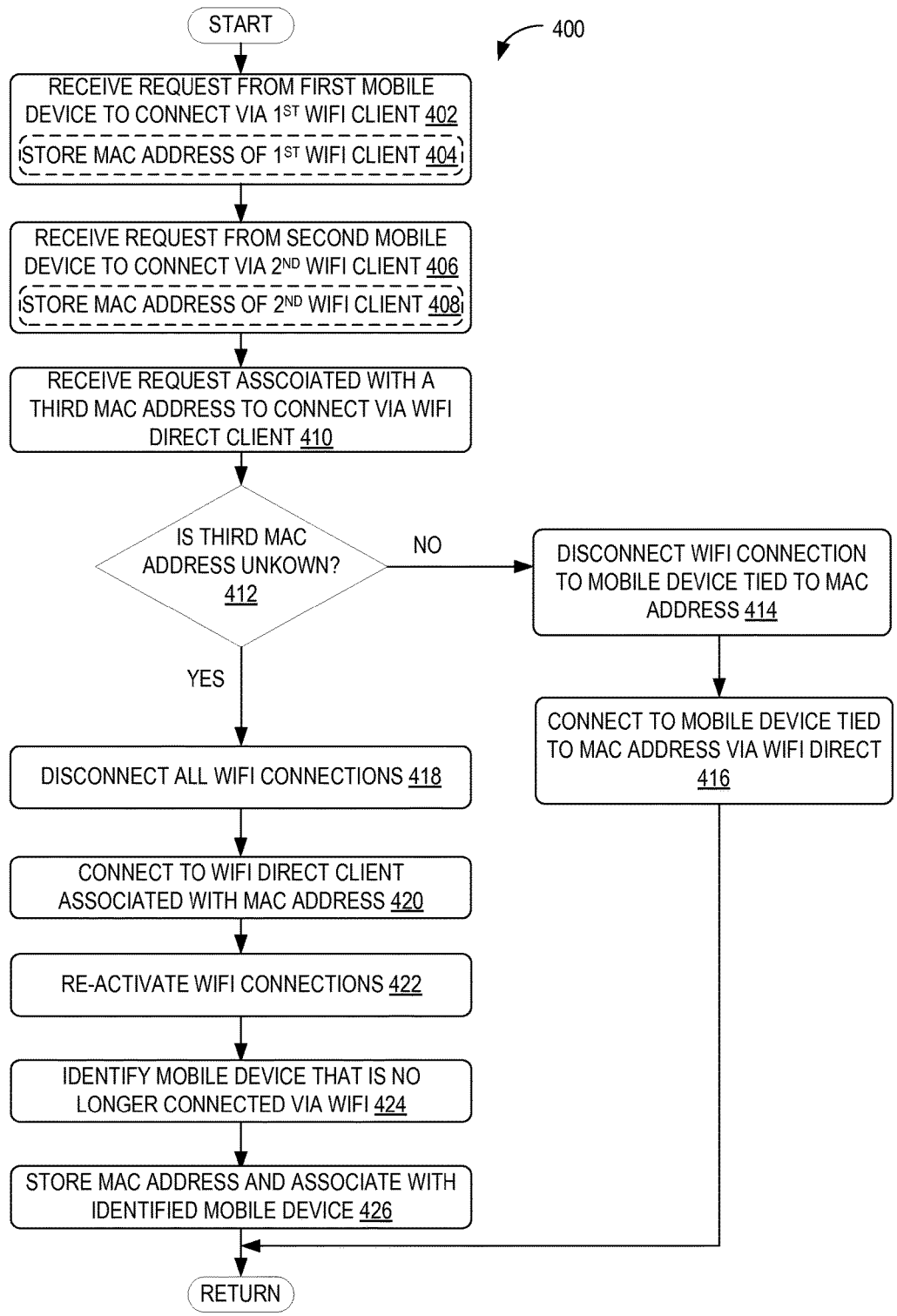
FIG. 4 is a flow chart of an example method of managing wireless connections in a communication system in accordance with one or more embodiments of the present disclosure.

FIG. 4 is an example method 400 of managing wireless connections in a communication system. For example, method 400 may be performed by a head unit of a vehicle, such as head unit 302 of FIG. 3. In other examples, method 400 may be performed by any computing device providing an access point to any other devices via different wireless clients. For illustrative purposes, the method 400 will be described as being performed by a head unit of a vehicle. At 402, the method includes receiving a request from a first mobile device to connect to the head unit via a first WIFI client (e.g., WIFI client 314a of FIG. 3). As indicated at 404, the head unit may store the MAC address of the first WIFI client as associated with the first mobile device. For example, the head unit may include (e.g., in a storage device that is local to the head unit and/or remote to but accessible by the head unit) a table or other element mapping MAC addresses to mobile devices that connect to the head unit.

The MAC address and/or an identifier of the first mobile device may be sent to the head unit as a part of the request to connect (e.g., in a header of a packet requesting the connection) and/or may be queried by the head unit. The head unit may store the MAC address and the identifier of the first mobile device as linked data (e.g., as entries of a table in which MAC addresses are mapped to mobile device identifiers). The table may be stored locally at the in-vehicle computing system and/or remotely from the in-vehicle computing system (e.g., at a storage device that is accessed by the in-vehicle computing system over a network/the Internet). For example, the in-vehicle computing system may synchronize and/or access the table over the Internet when the same driver has two or more vehicles and the table for each vehicle may be synchronized via a cloud-based service.

Figure 6B:
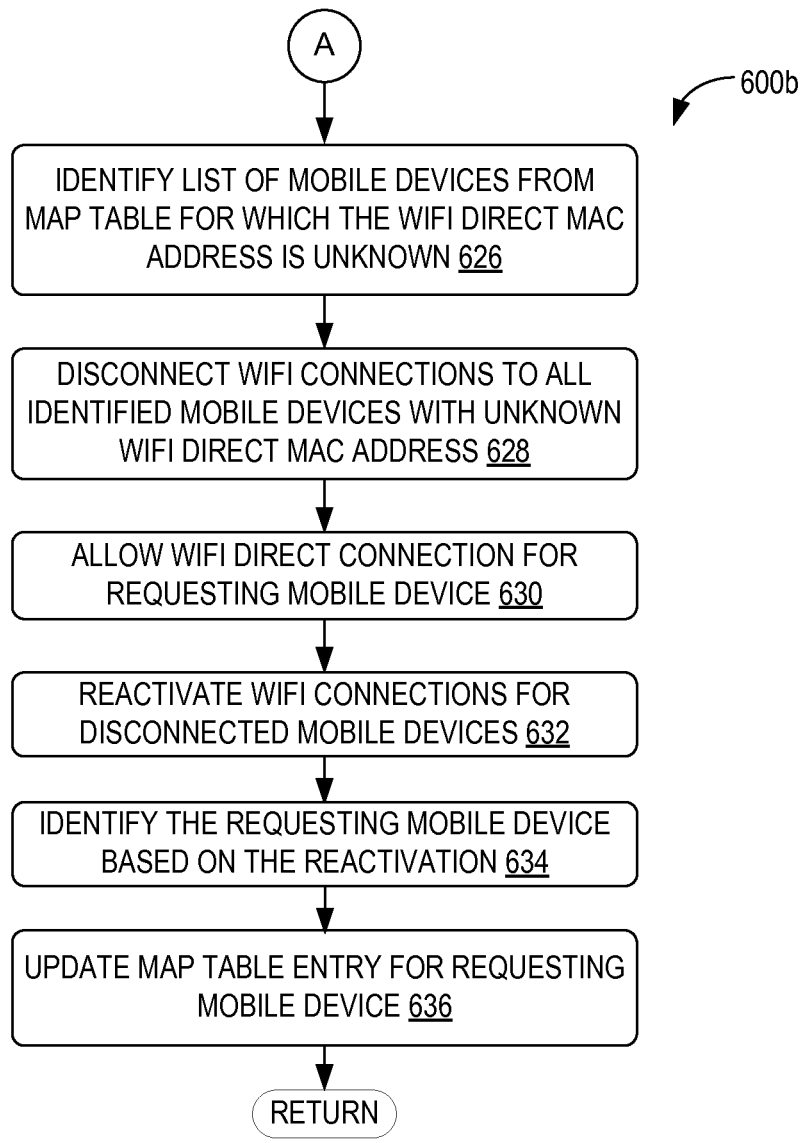

At 406, the method includes receiving a request from a second mobile device to connect via a second WIFI client (e.g., WIFI client 314b of FIG. 3). As indicated at 408, the head unit may also store the MAC address of the second WIFI client as associated with an identifier of the second mobile device, as described above with respect to the first mobile device. At 410, the method includes receiving a request associated with a third MAC address (e.g., different from the MAC addresses of the first and second mobile devices) to connect via a WIFI direct client (e.g., WIFI direct client 316a or 316b of FIG. 3). If the WIFI direct client is integrated in a mobile device that is already connected to the head unit (e.g., the first mobile device or the second mobile device), the head unit may not be able to comply with the request immediately. Accordingly, the method includes determining if the MAC address is unknown (e.g., not associated with a device in a map stored at/accessible by the head unit), as indicated at 412. For example, the method may only perform the MAC address check if the WIFI direct request is unable to be serviced due to a conflicting connection with a WIFI client (e.g., as determined based on an error when attempting to provide the connection). FIGS. 6A and 6B, described in more detail below, provide an example method of identifying and/or responding to conflicting connections.

If the third MAC address is known (e.g., "NO" at 412), the method proceeds to 414 to disconnect the WIFI connection to the mobile device tied to that known MAC address. After disconnecting the WIFI connection to the mobile device tied to the third MAC address, the method proceeds to connect to the mobile device via WIFI direct, as indicated at 416.

Conversely, if the third MAC address is unknown ("YES" at 412), the method proceeds to 418 to disconnect some are all WIFI connections temporarily (e.g., for a pre-determined time period, such as 10 seconds). For example, the head unit may temporarily terminate links to some or all mobile devices connected to the group owner. In some embodiments, the head unit may store information related to the ongoing wireless connections in order to re-establish connections after the time period has expired. In other embodiments, the mobile devices may continuously (e.g., at regular intervals) attempt to reconnect, allowing the connections to be re-established automatically upon receiving new connection requests from the WIFI clients of the mobile devices.

At 420, the method includes connecting successfully to the WIFI direct client associated with the third MAC address. At 422, the method includes re-activating the WIFI connections to the other mobile devices. The mobile device that is no longer connected via WIFI may be identified, as indicated at 424, based on a comparison of received WIFI connection requests that were received after re-activating the WIFI connections (e.g., after withdrawing the temporary prohibition to connect to the group owner) to WIFI connection requests that were received prior to disconnecting the WIFI connections and were not disconnected prior to the head unit-driven disconnection (e.g., the identifiers of the first and second mobile devices). At 426, the method includes storing the third MAC address and associating that MAC address with the mobile device identified at 424 as no longer being connected via WIFI. In some examples, the identification of the mobile device may occur after a threshold period of time in order to allow each of the devices to reconnect. By identifying the mobile device to which the third MAC address is associated, future attempts to connect via the WIFI direct client of that mobile device may be able to follow 414 and 416 to allow the WIFI direct connection request to be serviced without disconnecting the other connected mobile devices (e.g., by only disconnecting the mobile device that includes the WIFI direct client associated with that MAC address).

Figure 5:
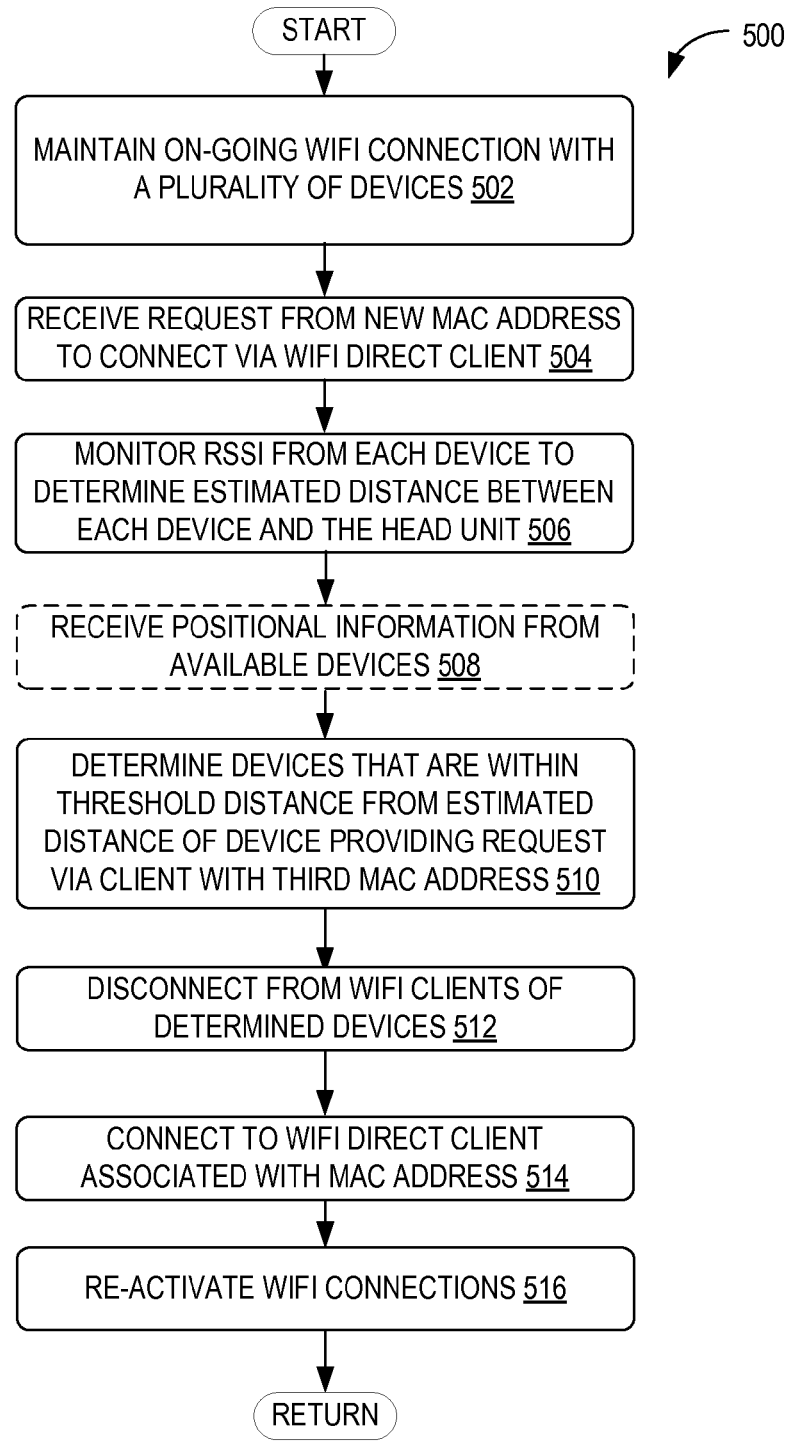
FIG. 5 is a flow chart of an example method of associating mobile devices with wireless communication requests in a communication system in accordance with one or more embodiments of the present disclosure.

In order to further refine the identification of the mobile device requesting connection via WIFI direct, the head unit may analyze additional features of connectivity. For example, FIG. 5 illustrates an example method 500 of identifying a mobile device requesting a WIFI direct connection and managing wireless connectivity accordingly. As described above with respect to FIG. 4, method 500 may be performed by any suitable computing device providing wireless connectivity, however, the method is described as being performed by a head unit (e.g., head unit 302 of FIG. 3) for illustrative purposes. At 502, the method includes maintaining an on-going WIFI connection with a plurality of devices. At 504, the method includes receiving a request from a new MAC address to connect via a WIFI direct client.

At 506, the method includes monitoring a received signal strength indication (RSSI) from each device that is connected to the head unit, as well as the device requesting the WIFI direct connection. In some embodiments, the RSSI of each connected device may be monitored for a threshold period of time in order to understand where the request is originating. As indicated at 508, the method may include receiving positional information from available devices. For example, some devices may be capable of sending positional data (e.g., positional data relative to the head unit, relative to one or more other devices, and/or absolute positional data, such as GPS/IZAT/Indoor Positioning System [IPS] data) to the head unit. Such positional data may be used to augment and/or replace the monitored RSSI data to provide an estimate of the distance between each device and the head unit.

At 510, the method includes determining devices that are within a threshold distance from the estimated distance of the device providing the request via the WIFI direct client with the third MAC address. In this way, the method may identify devices that are estimated to be in a similar location to the device requesting the WIFI direct connection. At 512, the method includes disconnecting from WIFI clients of the devices determined to be within the threshold distance at 510. For example, the head unit may only disconnect from one or a subset of the devices connected to the head unit (e.g., the group owner 304 of FIG. 3) via a WIFI connection. At 514, the method includes connecting to the WIFI direct client associated with the MAC address. At 516, the method includes re-activating the WIFI connections that were disconnected at 512. For example, the head unit may only re-connect to the one or subset of the devices described above, since the other devices maintained a connection to the head unit while the WIFI direct client was being connected. In other words, by identifying devices that are near a device requesting a WIFI direct connection, only devices that are near the requesting WIFI direct client (and thus having a high probability of including the WIFI direct client) may be disconnected to attempt to service the WIFI direct connection, while other devices that are outside of the threshold distance from the estimated distance of the WIFI direct client may not be disconnected from the head unit to service the WIFI direct connection request.

FIGS. 6A and 6B illustrate flow charts of a method 600a/600b for accessing and updating a MAC address table for wireless connection management. For example, method 600a/600b may be performed by a group owner/access point of a communication system and/or related computing device, such as group owner 304 and/or head unit 302 of FIG. 3. It is to be understood that any suitable computing device or combination of computing devices for managing wireless connections may perform method 600a/600b. Starting with FIG. 6A, method 600a includes, at 602, receiving a connection request from a mobile device (e.g., a requesting mobile device). At 604, the method includes determining if the connection is requested from a WIFI client of the mobile device or a WIFI direct client of the mobile device.

If the connection is requested by a WIFI client of the mobile device (e.g., "WIFI CLIENT" at 604), the method proceeds to 606 to look up the mobile device in a map table corresponding to WIFI client media access control (MAC) addresses. At 608, the method includes determining whether the MAC address of the requesting mobile device is found in the map table. If the MAC address is found (e.g., "YES" at 608), the method proceeds to 610 to allow the WIFI connection (e.g., to connect the requesting mobile device via WIFI). Conversely, if the MAC address is not found (e.g., "NO" at 608), the method proceeds to 612 to add a new entry to the map table corresponding to the requesting mobile device. For example, the MAC address of the requesting mobile device may be added to the table along with any other suitable identifier and/or log information indicating the connection request. Example values for the table may include <WIFI MAC, WIFI DIRECT MAC.=<MAC OF REQUESTING CLIENT, UNKNOWN>. After adding the new entry to the map table at 612, the method proceeds to 610 to allow the WIFI connection.

Returning to 604, if the connection is requested by a WIFI direct client of the mobile device (e.g., "WIFI DIRECT CLIENT" at 604), the method proceeds to 614 to look up the mobile device in the map table. At 616, the method includes determining if the MAC address of the mobile device is found in the map table. If the MAC address of the mobile device is found in the map table (e.g., "YES" at 616), the method proceeds to 618 to retrieve the WIFI MAC address of the requesting mobile device from the map table entry for that mobile device. At 620, the method includes determining if the WIFI MAC address of the requesting mobile device is among a list of currently-connected WIFI clients (e.g., WIFI clients currently connected to the computing device managing the wireless connections). If the WIFI MAC address of the requesting mobile device is not among the list (e.g., if the requesting mobile device is not already connected via its WIFI client, "NO" at 620), the method proceeds to 622 to allow the WIFI direct connection to be made. Conversely, if the WIFI MAC address of the requesting mobile device is among the list (e.g., if the requesting mobile device is already connected via its WIFI client, "YES" at 620), the method proceeds to 624 to disconnect the WIFI connection to the mobile device (e.g., to the WIFI client of the mobile device) before allowing the WIFI direct connection to be made at 622.

Returning to 616, if the MAC address for the requesting mobile device is not found in the map table (e.g., "NO" at 616), the method 600a proceeds to 626 of method 600b of FIG. 6B. At 626, the method includes identifying a list of mobile devices from the map table for which the WIFI direct MAC address is unknown. This list may narrow down the possible mobile devices (as identified by its WIFI client MAC address in the map table) that could correspond to the requesting mobile device. At 628, the method includes disconnecting the WIFI connections to all identified mobile devices with an unknown WIFI direct MAC address. In this way, only the mobile devices that have a potential conflict (e.g., those that have unidentified WIFI direct client MAC addresses) are disconnected. At 630, the method includes allowing the WIFI direct connection for the requesting mobile device to be made. At 632, the method includes reactivating each of the WIFI connections for the disconnected mobile devices. As the WIFI connection for the mobile device will not be able to be reactivated (due to the connection of that mobile device's WIFI direct client), the requesting mobile device may be identified as corresponding to the single mobile device in the map table that has a WIFI client that was not reactivated at 632. Accordingly, at 634, the method includes identifying the requesting mobile device based on the reactivation (e.g., identifying the one mobile device that did not reconnect via WIFI). At 636, the method includes updating the map table entry for the requesting mobile device to include the WIFI direct MAC address. For example, the values for the requesting mobile device in the map table may be set as <WIFI MAC, WIFI DIRECT MAC>=<EXISTING VALUE, MAC OF CURRENT WIFI DIRECT CONNECTION REQUEST>, where "EXISTING VALUE" corresponds to the existing, known, MAC address for the WIFI client of the requesting mobile device.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or head unit 302 described with reference to FIGS. 1 and 3. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system comprising:
a wireless communication interface including a soft wireless access point/group owner coupled to a physical network interface to provide access to a network;
a processor; and
a storage device storing instructions executable by the processor to:
receive a first request from a first device to initiate communication via a first wireless client of the first device;
during communication via the first wireless client, receive a second request to initiate communication via a second wireless client;
identify a unique identifier of the second wireless client;
determine whether the unique identifier of the second wireless client is associated with a device in a map that is accessible by the in-vehicle computing system, wherein the map includes a table of devices, at least one device in the table having an unidentified WIFI direct client address;
responsive to determining that the unique identifier of the second wireless client is not associated with a device in the map that is accessible by the in-vehicle computing system, disconnect a connection to one or more devices via one or more associated wireless clients including the first wireless client;
initiate communication via the second wireless client; and
selectively re-establish communication via the one or more associated wireless clients.

2. The in-vehicle computing system of claim 1, wherein the instructions are further executable to identify that communication is not re-established with the first device after the selectively re-establishing and, in response, associating the unique identifier of the second wireless client with an identifier of the first device in the map.

3. The in-vehicle computing system of claim 1, wherein the instructions are further executable to monitor a received signal strength indication (RSSI) from each device connected to the in-vehicle computing system and determine an estimated distance between each device and the in-vehicle computing system based on the RSSI.

4. The in-vehicle computing system of claim 3, wherein the instructions are further executable to determine an estimated distance between the second wireless client and the in-vehicle computing system based on an RSSI of the second wireless client and to determine devices that are within a threshold distance of the estimated distance of the second wireless client.

5. The in-vehicle computing system of claim 4, wherein disconnecting the connection to one or more devices via one or more associated wireless clients including the first wireless client comprises disconnecting only the devices determined to be within the threshold distance of the estimated distance of the second wireless client.

6. The in-vehicle computing system of claim 1, wherein the instructions are further executable to receive positional information from each device connected to the in-vehicle computing system and wherein disconnecting the connection to one or more devices via one or more associated wireless clients including the first wireless client comprises disconnecting only the devices determined to be within a threshold distance of the second wireless client based on the received positional information.

7. The in-vehicle computing system of claim 6, wherein the positional information includes one or more of GPS, IZAT, and IPS data.

8. The in-vehicle computing system of claim 1, wherein the unique identifier of the second wireless client comprises a MAC address of the second wireless client.

9. The in-vehicle computing system of claim 1, wherein the map comprises a table of devices, each device being mapped to one or more MAC addresses of wireless clients of that device.

10. The in-vehicle computing system of claim 9, wherein the table is stored locally at the in-vehicle computing system and/or stored remotely from the in-vehicle computing system and accessible by the in-vehicle computing system via the network.

11. The in-vehicle computing system of claim 1, wherein the soft access point provides connectivity to a first network and wherein the wireless interface further comprises a WIFI client communicatively connected to a wireless access point to provide connectivity to a second network.

12. The in-vehicle computing system of claim 1, wherein the first wireless client comprises a WIFI client and the second wireless client comprises a WIFI direct client.

13. A method of managing wireless connections in an in-vehicle computing system, the method comprising:
  receiving a first request from a first device to initiate communication via a first wireless client of the first device;
  during communication via the first wireless client, receiving a second request to initiate communication via a second wireless client;
  identifying a unique identifier of the second wireless client;
  responsive to determining that the unique identifier of the second wireless client is not associated with a device in a map that is accessible by the in-vehicle computing system, disconnecting a connection to one or more devices via one or more associated wireless clients;
  initiating communication via the second wireless client;
  selectively re-establishing communication via the one or more associated wireless clients;
  determining that communication with the first device via the first wireless client is not re-established after the selective re-establishing; and
  associating an identifier of the first device with the second wireless client in the map.

14. The method of claim 13, further comprising monitoring a received signal strength indication (RSSI) from each device connected to the in-vehicle computing system and determining an estimated distance between each device and the in-vehicle computing system based on the RSSI.

15. The method of claim 14, further comprising determining an estimated distance between the second wireless client and the in-vehicle computing system based on an RSSI of the second wireless client and determining devices that are within a threshold distance of the estimated distance of the second wireless client.

16. The method of claim 15, wherein disconnecting the connection to one or more devices via one or more associated wireless clients comprises disconnecting only the devices determined to be within the threshold distance of the estimated distance of the second wireless client.

17. A communication system comprising:
  a computing system including a wireless interface for providing connectivity to a network;
  a first mobile device connected to the network and the computing system via a first wireless client having a first unique identifier; and
  a second mobile device connected to the network and the computing system via a second wireless client having a second unique identifier,
  the computing system comprising instructions executable by a processor to:
    receive a request to initiate a connection to the network via a third wireless client having a third unique identifier;
    compare the third unique identifier to a map including unique identifiers mapped to device identifiers;
    determine whether the third unique identifier is found in the map;
    responsive to determining that the third unique identifier is not included in the map, disconnect the first wireless client and the second wireless client from the wireless interface, establish a connection with the third wireless client, and selectively re-establish a connection to the first wireless client and the second wireless client; and
    determine that the connection to the first wireless client is not re-established after the selective re-establishing and store an association between the third unique identifier and an identifier of the first mobile device in the map.

18. The communication system of claim 17, wherein the computing system is an in-vehicle computing system, wherein the first wireless client and the second wireless client are WIFI clients, and wherein the third wireless client is a WIFI direct client.

19. The communication system of claim 17, wherein the instructions are further executable to selectively disconnect the first and second wireless clients based on a received signal strength indicator received from the first and second wireless clients.

* * * * *